May 13, 1969 J. T. POLHEMUS 3,444,522

ERROR CORRECTING DECODER

Filed Sept. 24, 1965 Sheet 1 of 8

INVENTOR
JOHN T. POLHEMUS

BY Sughrue, Rothwell, Mion, Zinn & Macpeak
ATTORNEYS

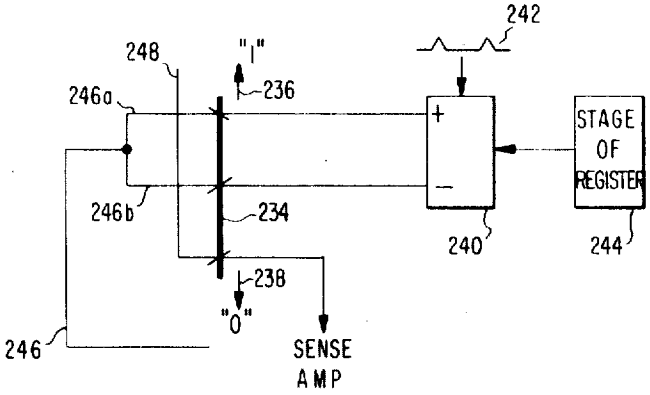
FIG.3A
CODE CORE
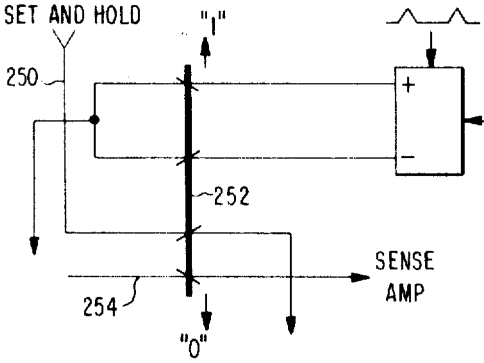
FIG.3B
GENERATOR CORE
FIG.3C
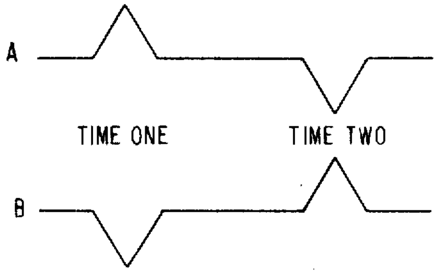
FIG.3D
| REGISTER SHIFT | CODE COLUMN | CODE | GEN |
|---|---|---|---|
| 1 | 1 | + | − |
| 0 | 1 | − | 0 |
| 1 | 0 | 0 | − |
| 0 | 0 | 0 | 0 |
INVENTOR
JOHN T. POLHEMUS
BY Hughes, Rothwell, Mion, Zinn & Macpeak
ATTORNEYS INVENTOR
JOHN T. POLHEMUS
BY Hughes, Rothwell, Mion, Zinn & Macpeak
ATTORNEYS

INVENTOR
JOHN T. POLHEMUS

BY Sughrue, Rothwell, Mion, Zinn & Macpeak
ATTORNEYS

INVENTOR
JOHN T. POLHEMUS

BY Hughes, Rothwell, Mion, Zinn & Macpeak
ATTORNEYS

INVENTOR
JOHN T. POLHEMUS

BY Hughes, Rothwell, Mion, Zinn & Macpeak
ATTORNEYS

| OUTPUT TERMINAL | NO ERRORS | 1 ERROR | 2 ERRORS | ERRORS ≥ 3 |
|---|---|---|---|---|
| $mb_0$ | 1 | 0 | 0 | 0 |
| $mb_1$ | 1 | 1 | 0 | 0 |
| $mb_2$ | 1 | 1 | 1 | 0 |

INVENTOR
JOHN T. POLHEMUS

BY Sughrue, Rothwell, Mion, Zinn & Macpeak
ATTORNEYS

INVENTOR
JOHN T. POLHEMUS

BY Sughrue, Rothwell, Mion, Zinn & Macpeak
ATTORNEYS

United States Patent Office 3,444,522
Patented May 13, 1969

3,444,522

ERROR CORRECTING DECODER

John T. Polhemus, Englewood, Colo., assignor to The Martin-Marietta Corporation, New York, N.Y., a corporation of Maryland Filed Sept. 24, 1965, Ser. No. 489,920
Int. Cl. G06f *11/04;* G08b *29/00;* G06k *9/00*
U.S. Cl. 340—172.5 18 Claims The present invention relates to a command decoder of the core matrix tye, and more particularly to a command decoder which is capable of simultaneously decoding the input signal and correcting errors therein.

Typically, in matrix-type command decoders the stored code words are wired into the matrix and the command word is compared to the stored codes. If the command word is matched to one of the stored codes, an output signal appears on the proper output lead indicating the presence of a particular code. The decoding matrix itself may be a relatively simple combination of ferrite cores and interrogate and sense lines properly wound to perform the desired functions. However, it is typical of most digital systems that some of the bits which are transmitted may be lost or garbled due to various well known causes. Referring particularly to command decoder systems, it is possible that certain bits in the command word may be lost when the command word is being transmitted to the decoder. Therefore, it is and has been desirable to provide some means for correcting these errors.

Obviously, if an error occurs in a single bit position, the abovedescribed prior art matrix decoder will not see a proper match between the command and the internally stored code, and therefore the desired output from the command decoder will not occur. The systems used in the prior art decoders for correcting errors have been complex and operate either subsequent to or prior to the decoding of the command word.

It is therefore an object of the present invention to provide a simple error correcting decoder which simultaneously decodes and corrects for errors in the command input word.

A further object of the present invention is to provide error correcting in a command decoder of the core matrix type by the addition of only a small number of extra cores.

Another object of the present invention is to provide a means for collecting and tabulating the number of errors in the comparison of a command word and an internally stored code in an error correcting decoder, and also to indicate a favorable comparison when the number of errors is less than a predetermined maximum.

The foregoing and other objects, features and advantages of the invention will be apparent from the following more particular description of preferred embodiments of the invention, as illustrated in the accompanying drawings, wherein.

Figures 1, 2:
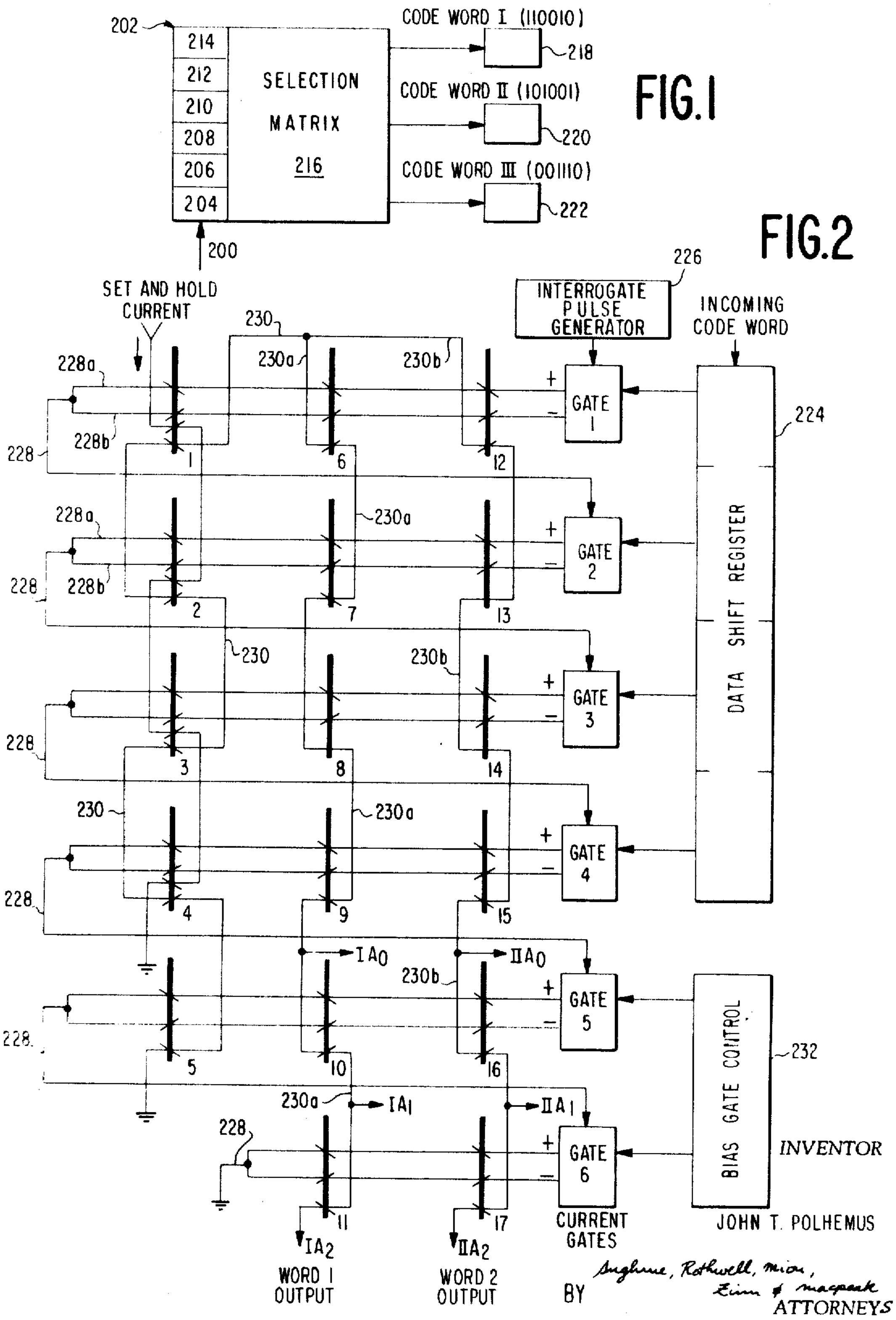
FIGURE 1 is a block diagram of a typical decoder.
FIGURE 2 is a partially schematic and partially block diagram of a preferred embodiment of the error-correcting decoder of the present invention.
Figure 4:
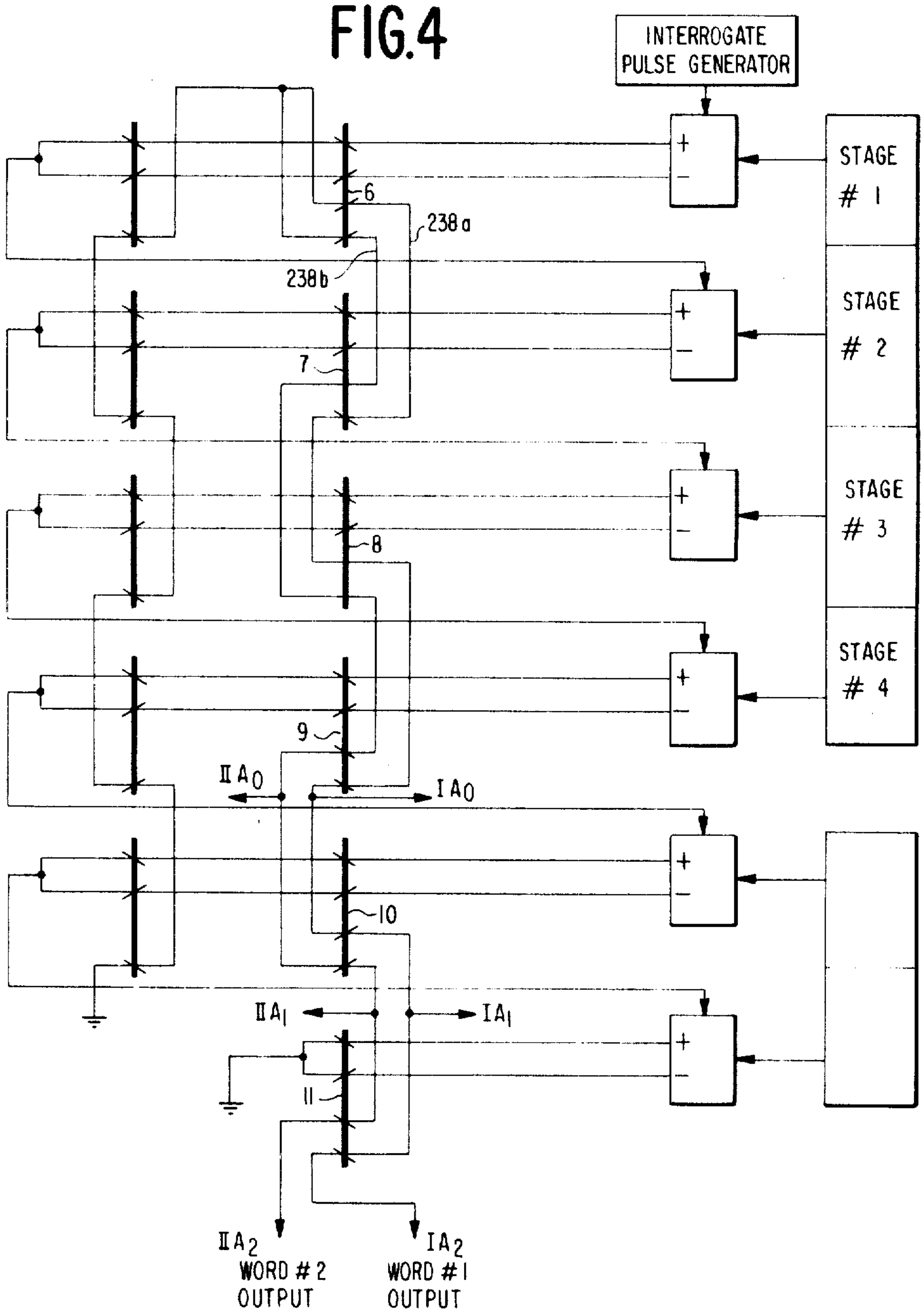
Figure 5:
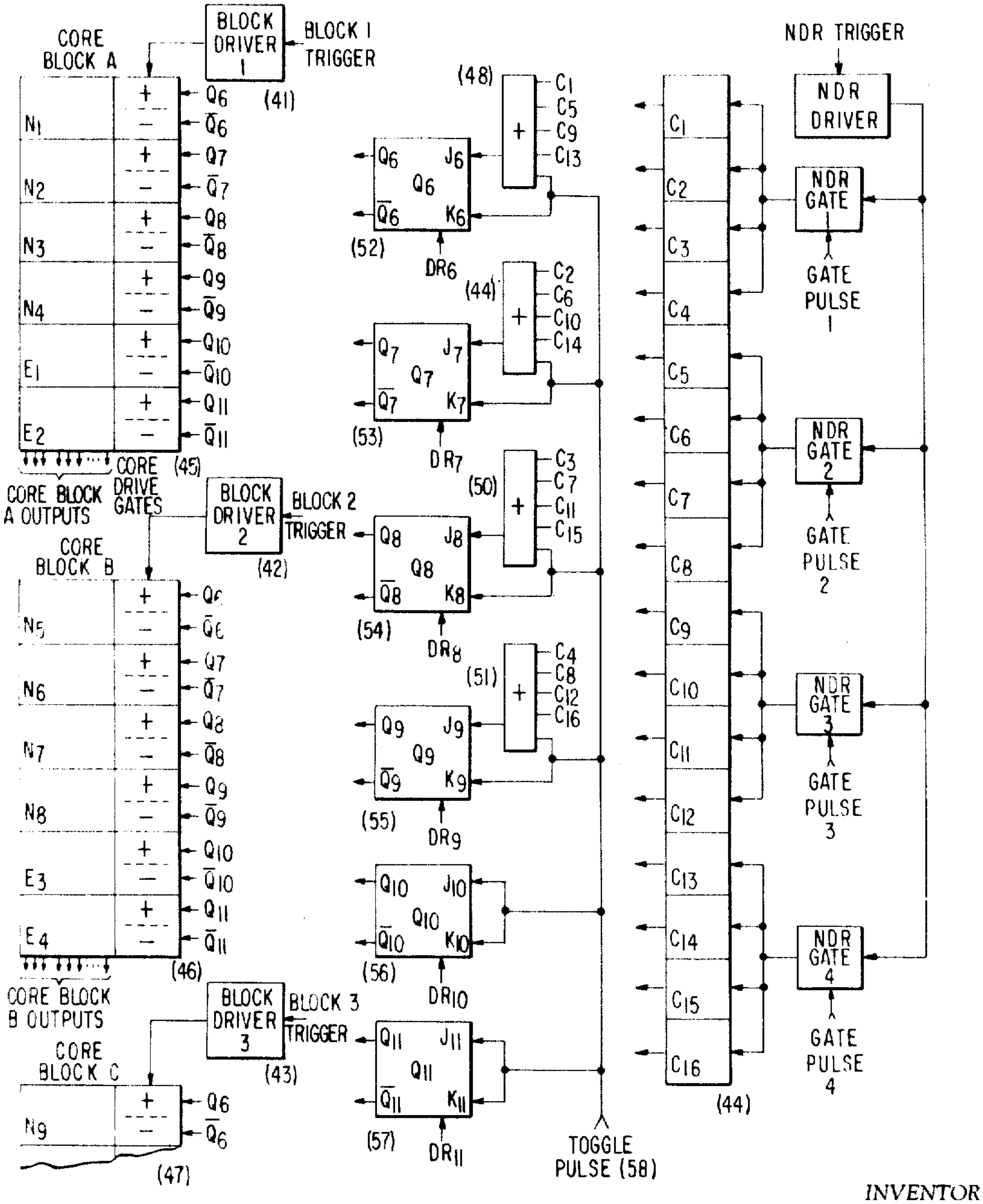
Figure 6:
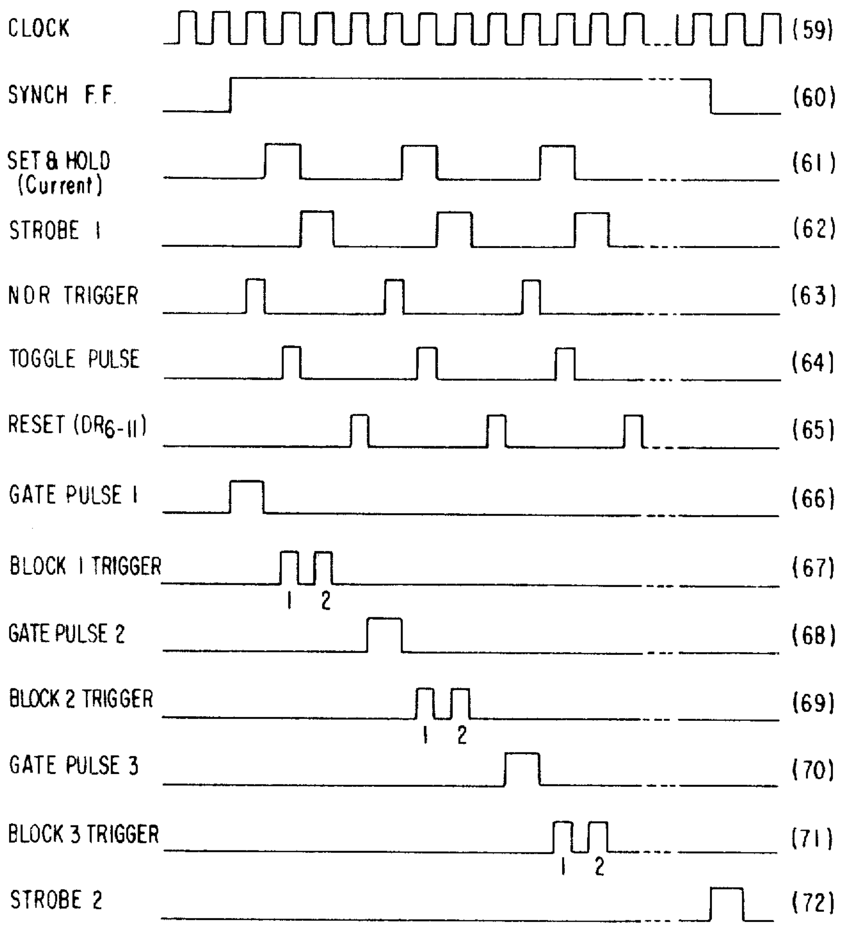
Figure 7:
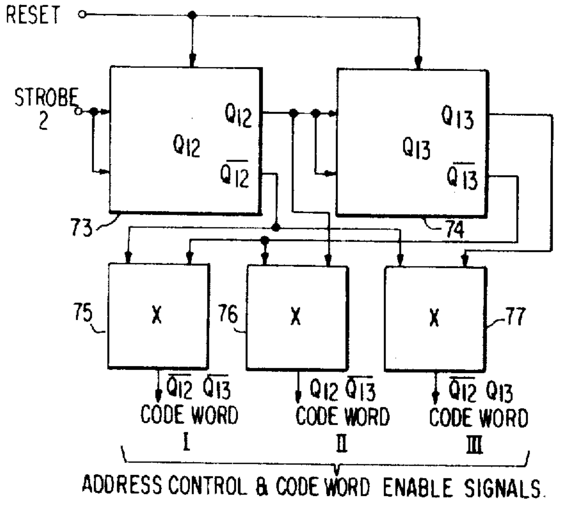
Figure 8:
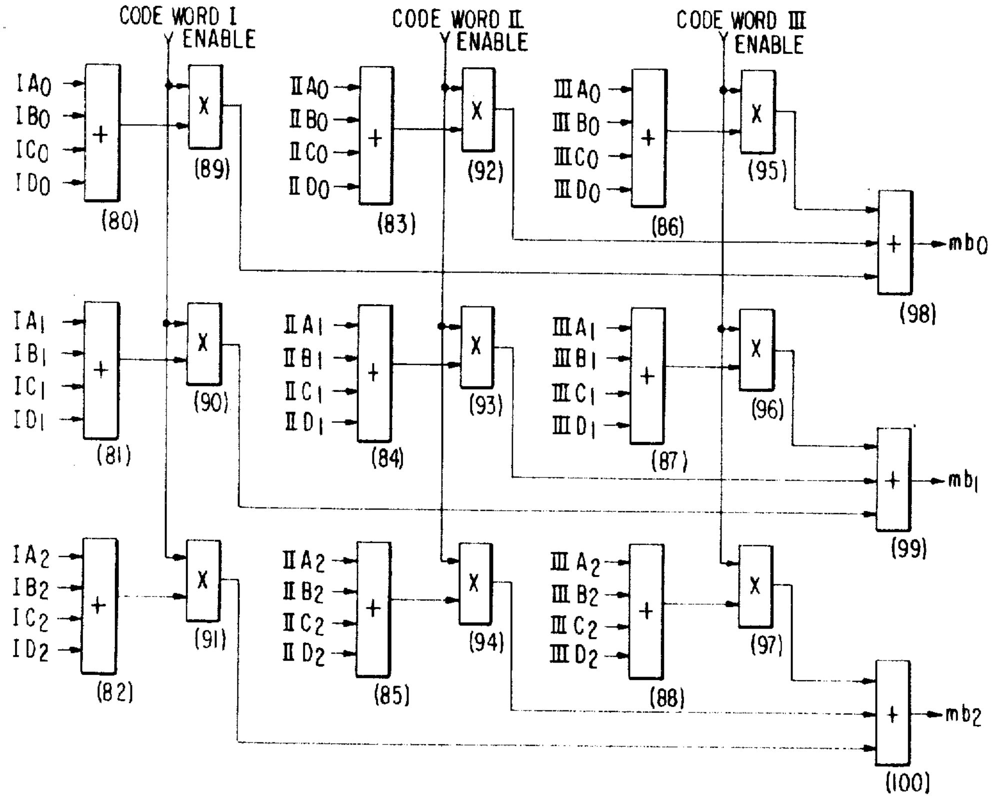
Figures 9, 10:
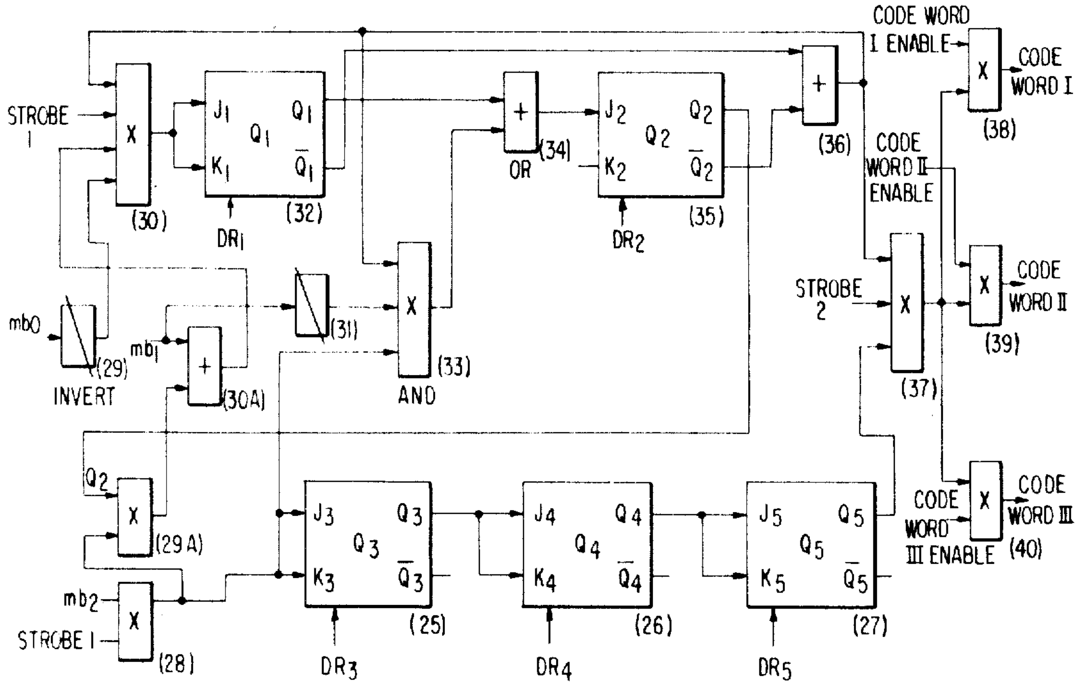
Figures 11, 12:
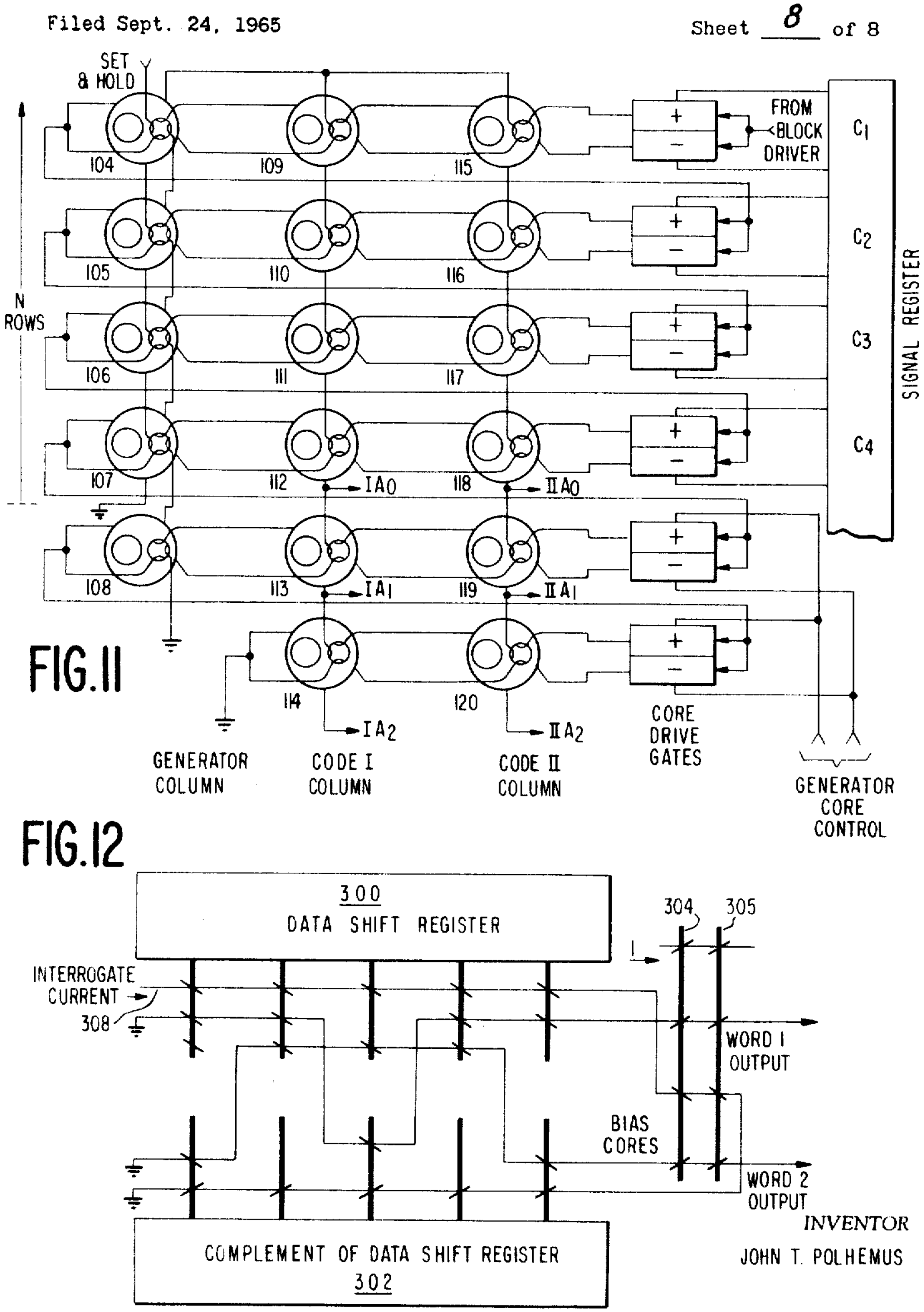

FIGURES 3*a* and 3*b* are diagrams illustrating the manner in which the code cores and generator cores, respectively, as shown in FIGURE 2 are wired;

FIGURE 3*c* is a waveform equivalent to the two interrogate pulses applied to the cores and FIGURE 3*d* is a truth table helpful in understanding the operation of the present invention;

FIGURE 4 is a partial schematic of a second preferred embodiment of the present invention;

FIGURE 5 is a block diagram of controlling circuitry for controlling the initiation of the interrogate signals to a plurality of matrix blocks and for controlling the interrogation sequence to each core;

FIGURE 6 is a timing diagram of certain waveforms applied in FIGURES 5, 8 and 10;

FIGURE 7 is a block diagram of a code word enabling generator;

FIGURE 8 is a block diagram of a data collection system for collecting the error indications from the code words in several blocks;

FIGURE 9 is a truth table indicating the output patterns for the indicated number of errors;

FIGURE 10 is a block diagram of the error tabulating and output system which counts the total number of errors up to a predetermined amount and indicates the presence of a particular code word when less than said predetermined number of errors are detected;

FIGURE 11 is a third preferred embodiment of the present invention; and

FIGURE 12 is a fourth preferred embodiment of the present invention.

In its simplest form, the error-correcting function of the present invention is carried out simultaneously with the decoding in a command decoder by the addition of a number of error-correcting cores which thread the particular decoder output lines. The additional cores are wound in such a manner as to contribute desired polarity pulses to the output lines, thereby cancelling opposite polarity pulses in the output line which are due to mismatches between the internally wired code and the command word.

Referring to FIGURE 1 there is shown a general block diagram of a typical decoder. As shown, the decoder is capable of detecting three possible code words, referred to respectively as code words I, II, and III. Also as shown, the code words are six-bit binary words and therefore the input commands would also be six-bit binary words. In operation, an input word to be decoded is applied at input 200 to shift register 202. Since we are concerned with six-bit words, shift register 202 contains six stages, 204, 206, 208, 210, 212, and 214. The output from shift register 202 is applied to a selection matrix 216 which is operable to compare the input word to the three internally stored code words. If there is a favorable comparison between the input word and one of the internally stored code words, e.g., code word II, a positive output from the selection matrix will be applied on the proper output lead, in this case on the code word II output lead. The other code word output leads will contain either zero or negative voltage signals.

Detectors 218, 220, and 222 are responsive only to positive input signals. Outputs from the detectors 218, 220, and 222 may be used in any of several well known manners such as initiating operation in other electronic equipment. To take a specific example, suppose an operator at some distant location desires to initiate operation of an electronic system which responds to the output of detector 220. The operator transmits binary word 101001 from his location to the location of the decoder. The latter binary word is shifted into the shift register 202 and selection matrix 216 detects that the binary word within the shift register is the same as internally stored code word II. Selection matrix 216 then provides a positive output on the code word II output lead thereby energizing detector 220 to control or initiate the desired other electronic equipment.

The present invention is concerned with decoders of the general type as that shown in FIGURE 1. However, it is also concerned with error correction in such decoders. The need for error correction is apparent from the following example. Suppose, in the decoding situation mentioned above, the last two bits of the input word are garbled or lost during transmission. The resulting word entered into shift register 202 would be 101010. Note that the latter word is different than code word II only in the last two bit positions. Without any error-correcting provision, there would be no positive output of the code word II output lead. In the present invention, however, an error correction system, which might more accurately be termed an error neglection system, is included within the selection matrix 216. The selection matrix 216 is set to neglect a given number of errors. In the descriptions of the drawings which follow, a two-error correcting system is explained, however, it will be apparent to those skilled in the art that a larger or smaller error-correcting system could be utilized. Assuming a two-error correction in the above-mentioned example, selection matrix 216 would neglect the two discrepancies between the information word and code word II and thus provide a positive output on the code word II output lead.

One preferred embodiment of the invention is shown in FIGURE 2, wherein the particular error correcting and selection matrix contains two internal code words, each being four bits long. The incoming code word is entered into four-stage register 224, the four stages respectively controlling plus-minus gates 1 through 4. Also, plus-minus gates 5 and 6 are controlled by the bias gate control 232, to be explained hereafter. The code cores in FIGURE 2 are illustrated by the heavy dark vertical lines 6, 7, 8, 9, 12, 13, 14, and 15. Cores 10, 11, 16, and 17 are the error-correcting cores, and cores 1 through 4 are the generator cores. Core 5 is called the bias core. The interrogate pulse generator 226 provides two spaced output pulses for each interrogate sequence. The latter two pulses pass through each of the gates 1 through 4 successively and along the interrogate line 228 which is branched into branch lines **228*a* and 228*b*. Only one interrogate pulse generator is needed in FIGURE 2 since the cores are wound such that the pulses from the single interrogate pulse generator 226 control the reset and set positions of every core. Sense line 230 is responsive to the magnetic flux changes in the bias core 5 and in the generator cores 1 through 4. Line 230 is then branched into lines 230*a* and 230*b***, referred to respectively as the core word I line and the core word II line. The core word I output is at $IA_2$ and the core word II output is at $IIA_2$.

The operation of the invention in FIGURE 2 may be better understood by first explaining the individual core responses to the interrogate pulses. In FIGURE 3*a* a core 234, which may be typical ferrite core as is well known in the art, is wired in the same manner as the code cores of FIGURE 2. It should be noted that mirror notation is used in the diagrams of the core circuits. In mirror notation, cores are represented by heavy lines, winding leads by light lines, and the sense of the magnetic field associated with the winding is found by reflecting the current by the mirror symbol at the intersection of the core in the winding lead. A magnetic field directed upward, as shown by arrow 236, is considered to be in the "1" direction and a magnetic field directed downward in the direction shown by arrow 238 is considered to be in the "0" state. The mirror notation may be better understood by assuming a positive pulse is applied on line **245*a* and is traveling away from plus-minus gate 240. As the positive pulse passes across the core 234, which is wound by line 246*a*, the mirror direction is in the direction of arrow 236 and therefore the positive pulse on line 246*a* wound place core 234 in the "1" state. A positive pulse on line 246*b* would then reset core 234** to its "0" state.

The interrogate pulse generator, not shown, provides a pair of pulses, as indicated by wave form 242, to the input of plus-minus gate 240. Depending upon the state of stage 244 of the shift register, the two pulses will divide upon passing through gate 240 with the first appearing out of the plus side and the second appearing out of the minus side, or vice versa. The first pulse of the interrogate pulse pair appears at time 1 and the second pulse appears at time 2. If stage 244 contains a binary "1," the first interrogate pulse will pass out of plus-minus gate 240 onto interrogate lead **246*a*, and at time 2, the second interrogate pulse will pass out of plus-minus gate 240 onto lead 246*b*. The effect of routing the two pulses to different branches of interrogate line 246** is the same as if the interrogate line were not branched and the pulses were of different polarity as shown in FIGURE 3*c*. Referring to waveform A in FIGURE 3*c*, at time 1 the positive pulse would set core 234 and at time 2 the negative pulse would reset core 234. The same effect is achieved by branching the interrogate line and maintaining both pulses positive.

If stage 244 of the register contains a binary "0," the interrogate pulse at time 1 passes out of the minus side of plus-minus generator 244 and the second interrogate pulse at time 2 passes out of the plus side. The equivalent waveform for a non-branched interrogate line is shown by waveform B in FIGURE 3*c*. Assuming the core 234 is initially reset, i.e., in the "0" state, the first pulse in the latter-mentioned sequence will have no effect on the state of the core, whereas the second pulse will set the core or place it in the "1" state.

When the interrogate pulse pair sequence is plus-minus, i.e., stage 244 of the shift register contains a binary "1," a positive voltage pulse is induced into sense line 248 at time 2. On the other hand, if a binary "0" is stored in stage 244 of the shift register, thereby causing a minus-plus sequence of the interrogate pulse pair, a negative pulse is induced into sense line 248 at time 2.

In FIGURE 3*b*, core 252 is wound in the same manner as the generator cores 1, 2, 3, and 4 of FIGURE 2. The plus-minus or minus-plus sequence of the interrogate pulse pair is again controlled by the associated stage of the shift register. It is to be noted that sense line 254 is wound in the opposite direction of sense line 248 of FIGURE 3*a* as indicated by the opposite mirror notations where the two sense lines intersect the cores. This opposite winding of sense line 254 would result in a negative pulse being induced therein where the interrogate pulse sequence is plus-minus and a positive pulse being induced therein when the interrogate sequence is minus-plus. However, due to the set and hold input winding 250, which is energized during time 1, thereby setting core 252 to the "1" state and holding it there, sense line 254 will see no induced pulse during the minus-plus sequence.

Considering the pulses induced into the sense lines at time 2, when the shift register contains a "1" and a code core is wound by the sense line, the code core will generate a positive pulse in the sense line and the generator core will generate a negative pulse in the sense line. When the shift register contains a "0" and the code core is wound by the sense line, the code core will produce a negative pulse and the generator core will produce no pulse. When the shift register contains a binary "1" and the code core is not wound by the sense line, the code core generates no voltage and the generator core produces a negative voltage. When the shift register contains a binary "0" and the code column is not wound by the sense line, the code core produces no voltage and the sense line in the generator core produces no voltage in the sense line. A truth table for the above sequence is shown in FIGURE 3*d* wherein a "1" in the code column indicates that a core is present in that column and it is wound by the sense line. A "0" in the code column indicates either that a core is not present in the position or if it is present, it is not wound by the sense line. A careful look at FIGURE 3*d* indicates that when the shift register and the code column contain the identical values, the total voltage induced in the sense line is zero, whereas, when there is a discrepancy, the total voltage induced into the sense line is negative.

Referring again to FIGURE 2, it can be seen that generator cores 1 through 4 contribute to all of the code word outputs. In other words, the sense line which provides the code word I output is **230*a* which is connected to 230. The first internally stored code word, referred to as code word I, is 1101. This can be seen by the linkage of code cores 6, 7, and 9 in column 1, but not core 8. The absence of a mirror at the intersection of a core and a winding indicates that the core is not wound by the winding. Code word II is 1001, i.e., code cores 12 and 15 are linked by winding 230*b*, whereas, code cores 13 and 14 are not linked. In the practice of the invention as shown in FIGURES 2, code cores 8, 13, and 14** may be completely eliminated since they do not contribute any induced voltage to the sense line.

If the incoming code word entered into data shift register 224 is the same as the first internally stored code, i.e., 1101, then at time 2, the pulses induced into the sense line by the code cores 6 through 9 will be canceled by the pulses induced into the sense line by the generator cores 1 through 4, resulting in a zero induced signal in the sense line output. However, for operation of other circuitry, it is desired to have a positive voltage at time 2 for the purpose of indicating the presence of a match. Therefore, bias core 5 is linked by the interrogate line 228 and the sense line 230 in such a manner as to always provide a positive pulse in the sense line at time 2. If there is a complete match between the input word and core code I, a positive signal will appear at point $IA_0$ at time 2. If there is an error in a single digit position, the combination of the code cores and the generator cores produces a single negative pulse which is cancelled by the positive pulse generated by bias core 5. The result then is a zero output at $IA_0$. If there are errors in two digit positions, the pulses induced into the sense line by the combination of code cores 6, 7, and 9, generator cores 1, 2, 3, and 4 and bias core 5 results in a single negative pulse output at $IA_0$.

As explained previously, in conjunction with the description of FIGURE 1, if the errors in two bit positions can be neglected then the system is in effect correcting for those two errors. The invention corrects the two errors by adding error-correcting cores 10 and 11 in code column I and error-correcting cores 16 and 17 in code column II. The bias gate control circuit 232 is arranged so that the interrogate pulse pair sequence out of gates 5 and 6 is always plus-minus, thereby causing error-correcting cores 10, 11, 16, and 17, and also bias core 5, to induce positive pulses into the sense lines as time 2. Therefore, if the output is taken at $IA_2$ for the code core I output and at $IIA_2$ for the code core II output, then when two or less errors occur in the comparison of the internally stored code word I and the word entered into the data shift register, the output at $IA_2$ will be a positive pulse indicating that code I has been selected. This can be seen by assuming that there are errors into two bit positions between internally stored code I and the input to the data shift register. At time 2 the total induced voltage into the sense line contributed by the code cores and the generator cores is two negative pulses; the bias core induces a single positive pulse; and the error-correcting cores generate one positive pulse apiece. The output at $IA_2$ is then a single positive pulse. It should also be noted that under these conditions the output at $IA_0$ (indicating no error correction) is a negative voltage pulse, and the output at $IA_1$ (indicating one error corrected) is zero voltage. Thus, by merely adding a small number of additional cores into the matrix, the decoder provides the function of error correcting at the same time it decodes the input word. It is obvious that the present method of decoding and error correcting is capable of decoding words of much greater length than four-bit positions, as shown in FIGURE 2, and is also capable of correcting for more than two errors. However, it should be kept in mind that the minimum Hamming distance between any two internally stored code words is dependent upon the number of errors corrected in the scheme. For example, the double-error correcting scheme shown in FIGURE 4 requires a minimum Hamming distance between the two codes equal to or exceeding five. The need for such separation should be obvious, since the lack of minimum separation between two code words would allow outputs on more than one code word output lead, thus creating an ambiguity.

When a single interrogate pulse generator is used, the number of codes and the individual code word length is limited by the number of cores which the single interrogate pulse generator is capable of setting and resetting.

One manner of increasing the number of allowable code words and/or code word lengths is to use the core rope technique. The latter technique is shown in FIGURE 4 which is identical to FIGURE 2 in all respects except that the codes 6, 7, 8, and 9 and the error-correcting cores 10 and 11 serve all of the internally stored code words. Branch line **238*a* links cores 6, 7, and 9, thereby creating a code word I equal to 1101, and branch line 238*b* links code cores 6 and 9**, thereby forming a code word II equal to 1001. The operation of the matrix shown in FIGURE 4 is the same as that shown in FIGURE 2, the major difference being that the interrogate pulse pair sees much less back voltage since fewer cores are used.

For code words of substantially greater length than that shown in FIGURES 2 and 4, it becomes desirable to divide the matrix into several blocks, and interrogate each block successively. The following description relates to just such a system which has relatively long code words and is therefore divided into blocks which must be successively interrogated. Although the number of code words stored, the number of bit positions per cord word, and the number of blocks, may be varied, it is assumed in the following discussion that the system described stores three code words, each code word is sixteen bits long and the matrix is divided into four blocks. Since the code words are sixteen bits long and the system is divided into four blocks, each block contains four code cores corresponding to each of the three code words. Each block also contains four generator cores, one bias core and two error-correcting cores for each of the three code words. Each block therefore corresponds to the matrix shown in FIGURE 2 except that an additional code word, code word III, is included. In the description of the sixteen-bit code word decoder and error corrector, reference will be had to FIGURES 5, 6, 8, 9, and 10.

The incoming word is first entered into shift register 44 shown in FIGURE 5. When triggered by a pulse from the NDR driver, the stages provide output pulses to the OR gates 48, 49, 50, and 51 as shown. There are four NDR gates which pass the NDR trigger, shown in FIGURE 6, to the different stages of shift register 44. For example, the gate pulse 1 occurs in coincidence with the first NDR trigger pulse, thereby enabling stages $C_1$, $C_2$, $C_3$, and $C_4$. The outputs from the latter mentioned stages are applied respectively to the J inputs of JK flip-flops 52, 53, 54, and 55 through OR gates 48, 49, 50, and 51. Assuming that JK flip-flops 52 through 55 are in their reset state (Q is low and $\overline{Q}$ is high) the inputs from the first four stages will toggle the flip-flops if the corresponding C stage contains a binary "1," but will not affect the flip-flops if the corresponding C stage contains a binary "0." Therefore, if $C_1$ and $C_2$ contain binary "1's" and $C_3$ and $C_4$ contain binary "0's," when the first NDR trigger is applied through NDR gate 1, JK flip-flops 52 and 53 will toggle thereby causing Q6 and Q7 to be high, and JK flip-flops Q8 and Q9 will remain the same thereby maintaining $\overline{Q8}$ and $\overline{Q9}$ high. The Q and $\overline{Q}$ outputs control the sequence of the interrogate pulse pair through the plus-minus gates of all four blocks, as indicated in FIGURE 5. The logic of the system is such that when the block 1 trigger generates the interrogate pulse pair which is applied to core block A, the outputs of flip-flops 52 through 55 are controlled by the binary digits stored in stages $C_1$ through $C_4$. When the block 2 trigger pulse appears, thereby causing an interrogate pulse pair to be applied to core block B, the outputs of flip-flops 52 through 55 are controlled by the data stored in stages $C_5$ through $C_8$ of shift register 44.

It can be seen from the waveforms in FIGURE 6 that a toggle pulse appears on line 58 subsequent to each NDR trigger pulse. The toggle pulses serve to toggle each JK flip-flop, thereby reversing its output state. In other words, assuming flip-flop 52 is in the reset state ($Q_6$ is low, $\overline{Q_6}$ is high) and also assuming that a binary "1" is stored in $C_1$, when an NDR trigger pulse is applied through NDR gate 1, an output from $C_1$ passes through OR gate 48 thereby causing flip-flop 52 to toggle to its set state ($Q_6$ is high, $\overline{Q_6}$ is low). Since $Q_6$ is high, the first pulse of the interrogate pulse pair passes through the plus side of the first plus-minus gate. Subsequent to the NDR trigger, as indicated by the waveforms in FIGURE 6, a toggle pulse appears causing JK flip-flop 52 to toggle to its reset state ($\overline{Q_6}$ is once again high). The latter condition occurs in time to allow the second pulse of the interrogate pulse pair from block driver 1 to pass through the negative side of the first plus-minus gate going into core block A. If a "0" had been stored in stage $C_1$, the sequences would have been the opposite.

JK flip-flops 56 and 57 control the plus-minus gates which in turn control the sequence of interrogate pulses applied to the error-correcting cores and the generator core. The latter two flip-flops are always placed in the SET state ($Q_{10}$ and $Q_{11}$ are high) prior to time 1, and are toggled to the RESET state ($\overline{Q_{10}}$ and $\overline{Q_{11}}$ are high) subsequent to time 1 and prior to time 2. The result is that the interrogate pulse sequence applied to the error-correcting cores and the generator core is always the desired plus-minus sequence.

Referring back to FIGURE 2, it was previously explained in the description pertaining thereto that only one output from each code column was necessary, those outputs being $IA_2$ and $IIA_2$. However, when the block system is being used, it is necessary to collect data from the different blocks and have a special detecting system for tabulating the errors from the individual code columns and providing an output signal to indicate a particular code, only when the total number of errors in that particular code is less than three. The method to be described for performing the above functions requires three outputs per block for each code word. If FIGURE 2 is now considered to be the A block of the overall system, the three outputs for code I are $IA_0$, $IA_1$, and $IA_2$. The Roman numeral indicates the code word, the letter indicates the block, and the sub-numeral indicates the number of errors neglected. Thus, if FIGURE 2 is the A block, it will be responsive to the data stored in stages $C_1$ through $C_4$ of shift register 44 (FIGURE 5) and will match that data against the first four bit positions of the internally stored sixteen-bit code. If there are no errors, the $IA_0$ output will be a +1 pulse, the $IA_1$ will be a +2 pulse, and $IA_2$ will be a +3 pulse. If there is one error in the match, $IA_0$ will be a "0" output, $IA_1$ will be a +1 output, and $IA_2$ will be a +2 output. Since the output detecting equipment used is capable only of differentiating between a positive pulse and the absence of a positive pulse, henceforth all positive pulse outputs will be referred to as "1" and all zero and negative outputs will be referred to as "0." The resulting truth table for the three outputs corresponding to a particular code column in a particular block is shown in FIGURE 9. Under the heading "Output Terminal" *m* is the code word, *b* is the block and the sub-number is the number of errors corrected.

Since, as explained in conjunction with FIGURE 5, the four blocks, A, B, C, and D, are interrogated successively, there will be no interference between the IA outputs and the IB outputs. Thus, the tabulating means, to be described later, may accept the column I outputs from block A first, followed by the column I outputs from block B, and in turn followed by the column I outputs of blocks C and D in succession. However, if only a single tabulator is used, it is necessary to prevent the tabulator from counting the errors in code words II and III, while it is supposed to be counting the errors in code word I. The data collection system which collects the outputs and sequentially provides them to the tabulator, is shown in FIGURE 8. The data collection system is essentially a gating matrix having a column length equal to the number of outputs from a single code column in a single block (three) and a row length equal to the number of internally stored code words (three). The outputs from the data collection system are indicated respectively as $MB_0$, $MB_1$, and $MB_2$. These three outputs at any one instant represent the three outputs from a single code column in a single block. AND gates 89 through 97 are enabled by the code word enable pulses. The code word enable pulses are generated such that when one is present the other two are absent, and therefore only those AND gates associated with the particular code word whose code word enable pulse is present provide outputs to the three OR gates 98, 99, and 100. Assume for the purposes of explanation that code word I enable pulse is present and therefore the outputs from the OR gates 98 through 100 represent the code word I outputs. Since the blocks are interrogated successively, the outputs of the data collection system due to the first interrogation will be $IA_0$, $IA_1$, and $IA_2$. The second interrogation will cause the outputs to be $IB_0$, $IB_1$, and $IB_2$, etc.

As mentioned previously, the truth table for the output terminals is shown in FIGURE 9. Thus, when $MB_0$, $MB_1$, and $MB_2$ are all "1's," there are no errors in the respective code and block to which the outputs are associated. It can further be seen from FIGURE 9 that the three outputs from the data collection system in FIGURE 8 have a unique output pattern for different errors below three, and are all "0" if there are three or more errors in the particular code and block.

In order now to detect whether the input word stored in shift register 44 (FIGURE 5) corresponds to one of the three codes, within plus or minus two errors, it is necessary only to count the number of errors indicated by the outputs of the data collection system in FIGURE 8 for a particular code word while each block is interrogated in succession and provide a "yes" output corresponding to the code word examined if the total number of errors counted is less than three. Each code word is successively examined while its enable pulse is present thereby energizing the associated AND gates in the data collection system of FIGURE 8.

The data tabulation system which counts the total number of errors is shown in FIGURE 10. The circuit of FIGURE 10 comprises basically two separate counters. The first counter comprising JK flip-flops 33 and 35 counts the total number of errors up to three. When a count of three is reached, the tabulating counter will accept no more error inputs and will remove one of the enabling inputs to AND gate 37. If an enabling input to AND gate 37 is removed, there is no output therefrom and thus there is no indication of the presence of a particular code in the shift register 44 (FIGURE 5).

The second counter is the output counter and comprises JK flip-flops 25, 26, and 27. The latter counter receives the "1" inputs from $MB_2$ and provides an enabling signal to AND gate 37 after four "1" inputs have been received.

As explained in conjunction with the above description of FIGURE 8, only one code word enable pulse is present at any one time. For the purpose of explaining the operation of FIGURE 10 it will be assumed that code word I enable pulse is present, thereby enabling AND gate 38. During the presence of the code word I enable pulse, the tabulator circuit samples successively the code word I outputs from the A, B, C, and D blocks. At the termination of the above sampling, a strobe 2 pulse is applied as an input to AND gate 37. If the total number of errors, when the input information is compared to code word I, is less than three, the other two inputs to AND gate 37 will be high, thus causing AND gate 37 to apply a positive pulse to AND gate 38. AND gate 38 in turn supplies an output pulse indicating the presence of code word I. The trailing edge of the strobe 2 pulse resets the flip-flops which form the tabulating counter and the output counter.

The logic of the circuit is as follows: Assume that the first block, block A, has three or more errors. The outputs would be as shown in column 5 of FIGURE 9. When the first strobe 1 pulse appears, the outputs from block A corresponding to the code I column would be sampled. Since $MB_2$ is "0," the output counter comprising JK flip-flops 25 through 27 will not receive four input pulses by the time strobe 2 pulse arrives. Thus, the bottom input to AND gate 37 will not be energized at the time strobe 2 arrives and code word I is effectively rejected because it has too many errors.

Assume now that the code I outputs from the first block indicate two errors and the code I outputs from the second block indicate one error. Under these conditions, the circuit should again block strobe 2 from passing through AND gate 37. When the first strobe 1 pulse arrives, thereby sampling the code I outputs from block A, $MB_0$ is "0," $MB_1$ is "0," and $MB_2$ is "1." Since the $Q_2$ output of flip-flop 35 is initially "0," there is no output from AND gate 29*a* and therefore there is no bottom input to OR gate 30*a*. Since $MB_1$ is "0," there is also no upper input to OR gate 30*a* and therefore there is no output from that OR gate. Consequently, at least one of the inputs to AND gate 30 is low and thus JK flip-flop 32 will not be toggled and will remain in the reset state ($Q_1$ low, $\overline{Q_1}$ high). However, all the inputs to AND gate 33 will be high thereby providing a positive pulse which passes through OR gate 34 and toggles flip-flop 35. Thus, at the end of sampling the code I outputs from block A, JK flip-flop 35 is in the set state and JK flip-flop 32 is in the reset state indicating an error count of two. Also one pulse has been received by the output counter from AND gate 28.

The present condition of the tabulating counter is such that if no further errors are tabulated when the B, C, and D blocks are sampled, the upper input to AND gate 37 will be high at the time of strobe 2, because it will be supplied with a positive signal by $\overline{Q_1}$ through OR gate 36. If, however, an additional error signal is indicated by the presence of a zero on input $MB_0$ when an additional strobe 1 sample pulse is received, JK flip-flop 32 will be toggled thus indicating the presence of a 3-error count in the tabulating counter. The result is that $\overline{Q_1}$ and $\overline{Q_2}$ are now low providing no output from OR gate 36. Since the output from OR gate 36 is also applied as inputs to AND gates 30 and 33, the receipt by the tabulating circuit of additional error indicating inputs will have no affect on the tabulating counter and the AND gate 37 will be disabled at the time strobe 2 pulse appears.

The code word enable pulses, referred to in connection with FIGURES 8 and 10, may be generated by a circuit such as the one shown in FIGURE 7.

This circuit provides code word enable signals by means of the output lines from gates 75, 76, and 77, which are energized successively by the counter composed of $Q_{12}$ and $Q_{13}$ (73 and 74). The counter has an input strobe 2, so that after each stored code word is scanned, the counter advances one count. After all words have been scanned, the counter may be reset by the reset line.

As an example, at the start of scan sequence, $Q_{12}$ and $Q_{13}$ will both be in the zero state, providing high outputs on $Q_{12}$ and $\overline{Q_{13}}$. These signals will provide a high output from gate 75 and low outputs from gates 76 and 77. A code enable signal is generated for code word I and not for code words II and III. After all code blocks (45, 46, and 47, FIGURE 5) have been scanned, strobe 2 will advance the counter and code word II enable will alone be generated for the next scan.

Although the invention has been explained with the assumption that the matrix used is that of FIGURE 2 or FIGURE 4, it will be apparent to those skilled in the art that other non-identical matrices using the teachings of the present invention may be effectively utilized. For example, one such other matrix is shown in FIGURE 11, wherein each core or core position of FIGURE 2 is replaced by a MAD device. The operation of MAD devices (multi-aperture ferrite device) has been well explained in the literature. See, for example, flux switching in multipath cores by D. Nitzan, Report 1, SRI Project 3696, Stanford Research Institute, November 1961. In FIGURE 11, the matrix wires link the minor apertures of the MAD devices in exactly the same way as they link the single aperture cores in FIGURES 3 and 4. The "1's" and "0's" would be located as dictated by the code words to be placed in the various code columns. The operation of MAD and single-aperture core matrices are the same, because storing a "1" in a MAD allows flux reversal around the minor aperture, while storing a "0" blocks the core so that flux reversal around the minor aperture cannot occur. The advantage of using MAD devices is that the internally stored codes may be electronically altered.

An additional method of implementing the error-correcting scheme is obtained by using two shift registers plus additional bias cores as shown in FIGURE 12. The core shift registers 300 and 302 are shown in block form with the cores of the registers protruding so that the additional interrogate and sense windings may be indicated. The operation of a core shift register is well known in the art and will not be described herein. It is assumed that the incoming code word to be examined is shifted into data shift register 300 while its complement is simultaneously shifted into the complement-of-data shift register 302. Once the code word and its complement have been shifted into the two registers a comparison with the fixed wired words held in the array is made by resetting all cores to zero with an interrogate current at input 308. Any core that holds a "1" at the time of interrogation will induce a negative unit of voltage in any sense line linking that core, but if the core holds a "0," the core will not be switched and no voltage (or a very small disturb voltage) will be induced. Since the state of the first core of the data register 300 is opposite to that of the first core of the complement-of-data shift register 302, and so on down the registers, it may be seen that, for any given word pattern shifted into the array, a sense wire may be threaded so as not to link cores being switched from "1" and "0". This is a perfect match and produces no voltage at the output terminal of the sense line (neglecting the bias core contribution); but for each mismatch, one unit of negative voltage wil be induced in the sense line. As shown in FIGURE 12, the word I sense line is threaded to match an input code word having the binary sequence 00100.

If each word sense line feeds a sensing device that will accept one unit or more of positive voltage, but will reject zero or any negative value of voltage, a bias core is needed in addition to a match to contribute this one unit of positive voltage. If two bias cores 304 and 305 are used, a particular word sense line will produce at least one positive unit of voltage with one mismatched bit. In this way, one error can be neglected, which means the other has been corrected. The bias cores are arranged to contribute one positive unit of voltage each to every word sense line on interrogation, for these are always set to the "1" state for interrogation. The number of errors corrected will be determined by the number of bias cores used. It should be apparent that the first bias core used serves the same function as bias core 5 of FIGURE 2, whereas the additional bias cores contribute the same function as error-correcting cores 10 and 11 of FIGURE 2.

The block system explained previously may also be used in conjunction with the shift register type of decoder and error corrector as shown in FIGURE 12. For example, if it were desired to provide a two-error correcting decoder having very long code words, a plurality of blocks, each similar to FIGURE 12, could be used with the exception that an additional bias core would be necessary and outputs would have to be taken from points subsequent to each of the three bias cores along the individual word sense lines. The three outputs from each word sense line would be applied to tabulating circuitry identical to that shown in FIGURES 8 and 10.

In summary, the invention described shows a scheme wherein command decoding and error correcting are performed simultaneously in the same circuit. These error-correcting schemes presented should prove valuable in missile and space applications due to their low compact logic configurations, low standby power requirements, reliability, and immunity to radiation.

While the invention has been particularly shown and described with reference to preferred embodiments thereof, it will be understood by those skilled in the art that various changes in form and details may be made therein without departing from the spirit and scope of the invention.

What is claimed is:

1. A core matrix decoder of the type having separate output sense lines, threading different combinations of the cores in said matrix, for several internal code words respectively, the improvement comprising, a first additional core threaded to induce a desired polarity pulse in at least one of said sense lines, and $n$ error correcting cores threaded by at least one sense line for neglecting $n$ errors in a comparison of the command input word and the code word represented by said one sense line, whereby the output on said one sense line is a pulse of the desired polarity when the command word equals the digit word $\pm n$ digit errors.

2. A command decoder comprising (a) input means for receiving and storing a command input of $x$ digital length, (b) a core matrix having a plurality of sense lines each corresponding to a different code and each threading a different combination of code cores, the threaded combination determining the code, (c) $n$ error-correcting cores, said sense lines threading said $n$ error-correcting cores, (d) an interrogate line threading all of said cores including a bias core, and (e) means controlled by said input means for causing a desired polarity output on a particular sense line when the command code equals the particular sense line code $\pm n$ digit errors.

3. A command decoder of the type having an input storage means for storing the command signal, a core matrix having a number of internally wired codes and a sense line for each code whereby a sense line provides a desired polarity pulse when the command code corresponds with the internally wired sense line code, the improvement comprising additional core element means in combination with said matrix for neglecting a predetermined number of errors in said command signal simultaneously with the decoding of said command signal.

4. A command decoder of the type capable of providing a desired polarity pulse on the output of one of several output sense lines when the command signal corresponds to the code corresponding to the particular output sense line, the improvement comprising (a) a sense line, (b) $l$ generator cores and one bias core threaded by said sense line where $l$ is the word length of the codes, said bias core being threaded so as to always induce a desired polarity pulse in said sense line, (c) a plurality of code cores positioned to be threaded selectively by said output sense lines in accordance with the following pattern: A code core threaded by an output line corresponds to a binary "1" in the code of said output sense line, the absence of threading by said sense line of a code core in a code core position corresponding to a binary "0" of said code, whereby the maximum number of code cores threaded per sense line is $l$, (d) $n$ error-correcting cores per output sense line for neglecting $n$ errors in a comparison of the command code with a stored code simultaneously with the decoding of said command code.

5. The commander decoder as claimed in claim 4 further comprising (a) an interrogator pulse generator, (b) an interrogate line threading all of said cores, (c) an input register for receiving and storing said command word, (d) $l$ gates, each responsive respectively to a corresponding digit of said command word for controlling the sequence of flux switching in one of said generator cores and in all code cores corresponding to the same digit position of their respective codes as the digit position of said corresponding digit of said command word, (e) the first of said $l$ gates interposed between said interrogate pulse generator and said interrogate line, the other of said $l$ gates being interposed along said interrogate line in positions subsequent to the cores whose switching sequence is controlled by the next previous gate and prior to the cores whose switching sequence it controls, (f) $n$ additional gates interposed in said interrogate line and controlled so as to always insure a desired flux switching sequence in said error correcting codes, one of said additional gates always controlling the flux switching sequence of said bias core, and (g) means threading said generator cores for preventing one of two possible flux switching sequences from occurring in said generator cores.

6. A command decoder and error corrector of the ferrite core matrix type comprising (a) an input register having $l$ stages for receiving and storing a command word of length $l$, (b) $l$ generator cores each corresponding to a different stage of said register, (c) $y$ code cores each corresponding to a selected register stage of said register to form an internal code word equivalent to a binary word with ones where a code core corresponds to a register stage and zeroes where no code core corresponds to a register stage, (d) a sense line threading said code cores so as to have induced therein pulses of a desired polarity when said code cores are switched from a SET to a RESET state, said sense line threading said generator cores so as to have induced therein pulses of opposite polarity when switched from SET to RESET state, (e) a bias core and $n$ error-correcting cores threaded by said sense line so as to produce desired polarity pulses in said sense line when switched from SET to RESET states, where $n$ is the number of errors to be corrected by said command decoder and error corrector, (f) a pulse generator for producing a pair of interrogate pulses at times 1 and 2 respectively, (g) means for placing said generator cores in the SET state and holding them in the SET state during time $l$, (h) $l$ control gates corresponding to the $l$ stages of said register, each being responsive to a register stage digit and said pulse pair for controlling the SET-RESET sequence of the code core and generator core corresponding to said register stage, and (i) $n$ control means, each controlling the flux switching sequence of one of said error-correcting cores and one of said control means controlling the flux switching sequence of said bias core, responsive to said pulse pair for switching said error-correcting cores and said bias core to the SET state at time 1 and to the RESET state at time 2.

7. A command decoder and error correctior as claimed in claim 6 wherein the sequence of flux switching controlled by said $l$ gates is SET at time 1 and RESET at time 2 when the digit of the command word in the corresponding stage of the register is a binary "1," and RESET at time 1 and SET at time 2 when the digit of the command word in a corresponding stage of the register is a binary "0."

8. A command decoder of the type having generator cores and code cores threaded by interrogate wires and sense wires so as to provide a zero total voltage induced in a sense line which threads the code cores in such a manner as to represent an internally stored code when said code is equal to the input command word, the improvement comprising first means associated with said sense lines for generating a desired polarity pulse in said sense line, second means for inducing $n$ desired pulses in said sense line where $n$ is the number of errors to be corrected in said command word.

9. A command decoder and error corrector comprising:

(a) a plurality of decoding matrix blocks, each block coded to compare a portion of an input command word to a portion of a number of codes, each block having $n$ outputs per code portion stored therein, where $n—l$ is the number of errors corrected, (b) means in each block associated with each code portion for contributing desired polarity pulses to all but the first of said $n$ outputs whereby the output pattern for a code portion is

| | 0 error | 1 error | 2 errors ... | n errors |
|---|---|---|---|---|
| Output z1 | +1 | 0 | 0 ... | 0 |
| Output z2 | +1 | +1 | 0 ... | 0 |
| Output z3 | +1 | +1 | +1 ... | 0 |
| . | . | . | . | . |
| . | . | . | . | . |
| Output n | +1 | +1 | +1 ... | 0 |

where +1 indicates a desired polarity signal and "0" indicates a signal other than said desired polarity signal, (c) tabulating means responsive to outputs from selected code portions in selected blocks for counting the total number of errors in the code selected, (d) means for sampling the blocks successively and the codes successively for supplying the outputs from the code portions to the tabulating means, and (e) means responsive to a count of less than $n$ in said tabulating means for indicating the internally wired code word which is equal to the command word $\pm n$ digit errors.

10. The system as claimed in claim 9 wherein said block comprises, (a) code cores threaded by interrogate and output lines to form the internally wired code portions, (b) generator cores, equal in number to the code portions of said code words, for cancelling signals in said output lines generated by said code cores when a match occurs between a code portion formed by said code cores and a portion of the command word, and (c) a bias core for inducing a desired polarity pulse into all output lines.

11. The command decoder as claimed in claim 9 wherein said tabulator comprises, (a) a first counter, (b) means responsive to the error indicating inputs to said tabulator for advancing said first counter, (c) disable means responsive to a count of $n$ errors in said counter for preventing further inputs to said first counter and for disabling all said indicating means.

12. The command decoder as claimed in claim 11 wherein said tabulator comprises, (a) a second counter responsive to the +1 outputs from the $n$th output leads of each code word portion in each block, (b) means associated with said second counter for normally disabling said indicating means for removing the disabling control when said second counter receives a total number of +1 inputs equal to the number of blocks per code word, and (c) means for resetting said first and second counters to zero accumulation after all blocks containing portions of a code word are sampled.

13. A command decoder of the core matrix type wherein a command word is compared with an internally wired code and an output indication appears on the corresponding code output line when a favorable comparison occurs, the improvement comprising, (a) a first plurality of cores for holding said command word, (b) a second plurality of cores for holding the complement of said code word, (c) a sense line threading either one of said first plurality of cores or one of said second plurality of cores for each digital position in said command word, the particular pattern of threading determining the internally wired code, (d) means for applying an interrogating signal to all of said first and second plurality of cores whereby the number of undesired polarity pulses induced into said sense line is equal to the number of digit position mismatches between the command word and the internally stored code word, (e) a bias core threaded by said sense line and also responsive to said interrogation signal for inducing a desired polarity pulse in said sense line, and (f) $n$ error-correcting cores threaded by said sense line and responsive to said interrogation signal for inducing $n$ desired polarity pulses into said sense line, where $n$ equals the number of errors corrected by said command decoder.

14. The command decoder as claimed in claim 13 wherein said first plurality of cores forms a first shift register for receiving said command words and said second plurality of cores forms a second shift register for receiving said complement of command word.

15. The decoder as claimed in claim 14 further comprising additional sense lines, each of said additional sense lines linking unique combinations of said first and second plurality of cores to form unique internally wired codes, said additional sense lines also linking said bias and error-correcting cores.

16. A command decoder of the core matrix type wherein a command word is compared with an internally wired code and an output indication appears on the corresponding code output line when a favorable comparison occurs, the improvement comprising, (a) a first plurality of cores for receiving and holding said command word, (b) a second plurality of cores for receiving and holding the complement of said command word, and (c) a plurality of sense lines, each of said sense lines threading a unique combination of said first and second plurality of cores to form unique internally wired codes.

17. The command decoder as claimed in claim 16 wherein said first plurality of cores is a first core shift register and said second plurality of cores is a second core shift register.

18. The command decoder as claimed in claim 16 further including a bias core linked by all of said sense lines for producing a desired polarity pulse in said sense lines when interrogated by an interrogate signal, and an interrogate line adapted to receive an interrogate signal, linking all of said first and second pluralities of cores and said bias core.

References Cited

UNITED STATES PATENTS

| | | |
|---|---|---|
| 3,221,158 | 11/1965 | Roth et al. |
| 3,221,308 | 11/1965 | Petersen et al. |
| 3,267,431 | 8/1966 | Greenberg et al. |
| 3,284,775 | 11/1966 | Koerner et al. |
| 3,289,180 | 11/1966 | Loughhead. |
| 3,346,844 | 10/1967 | Scott et al. |

PAUL J. HENON, *Primary Examiner.*

U.S. Cl. X.R.

340—146.1, 146.2, 146.3, 166, 174